United States Patent
Paquet et al.

(10) Patent No.: US 10,333,736 B2
(45) Date of Patent: Jun. 25, 2019

(54) METHOD AND APPARATUS FOR RE-ESTABLISHING A RING TOPOLOGY FOLLOWING A LOSS OF POWER

(71) Applicant: COOPER TECHNOLOGIES COMPANY, Houston, TX (US)

(72) Inventors: Ghislain Paquet, Beaumont (CA); Alain Picotte, Levis (CA); Remi Dutil, Quebec (CA); Ronald Landheer, Quebec (CA)

(73) Assignee: EATON INTELLIGENT POWER LIMITED, Dublin (IE)

( * ) Notice: Subject to any disclaimer, the term of this patent is extended or adjusted under 35 U.S.C. 154(b) by 333 days.

(21) Appl. No.: 15/208,093

(22) Filed: Jul. 12, 2016

(65) Prior Publication Data
US 2018/0019896 A1  Jan. 18, 2018

(51) Int. Cl.
*H04L 12/437* (2006.01)
*H04L 12/66* (2006.01)
*H04L 12/721* (2013.01)
*H04L 12/703* (2013.01)
*H04L 12/781* (2013.01)

(52) U.S. Cl.
CPC ............ *H04L 12/437* (2013.01); *H04L 12/66* (2013.01); *H04L 45/66* (2013.01); *H04L 45/28* (2013.01); *H04L 45/52* (2013.01)

(58) Field of Classification Search
None
See application file for complete search history.

(56) References Cited

U.S. PATENT DOCUMENTS

| | | | |
|---|---|---|---|
| 9,100,210 B2* | 8/2015 | Balasubramanian | ........................ H04L 12/437 |
| 2010/0246385 A1* | 9/2010 | Balasumbramanian | ...................... G05B 19/0423 370/222 |
| 2013/0121158 A1* | 5/2013 | Balasubramanian | ........................ H04L 12/437 370/241 |
| 2014/0105004 A1* | 4/2014 | Batke | .................. H04L 63/1458 370/230 |
| 2016/0353321 A1* | 12/2016 | Bell | .......................... H04L 1/22 |

FOREIGN PATENT DOCUMENTS

| | | |
|---|---|---|
| WO | 2008/087571 A2 | 7/2008 |
| WO | 2010/065688 A1 | 6/2010 |

OTHER PUBLICATIONS

European Patent Office, "International Search Report and Written Opinion", PCT/US2017/033239, dated May 18, 2017, 11 pp.

* cited by examiner

*Primary Examiner* — Edan Orgad
*Assistant Examiner* — Emmanuel K Maglo
(74) *Attorney, Agent, or Firm* — Eckert Seamans

(57) ABSTRACT

A gateway for a computer network includes a programmable integrated circuit device, and a first port and a second port coupled to the programmable integrated circuit device. The programmable integrated circuit device is structured and configured to, responsive to a restoration of power to the gateway following a loss of power at the gateway, read configuration information stored by the gateway, and if indicated by the configuration information, forward first data traffic from the first port to the second port and forward second data traffic from second port to first port until the programmable integrated circuit device is configured to do otherwise.

30 Claims, 4 Drawing Sheets

METHOD AND APPARATUS FOR RE-ESTABLISHING A RING TOPOLOGY FOLLOWING A LOSS OF POWER

BACKGROUND

Field

The disclosed concept pertains generally to computer networks that implement ring topologies, and, more particularly, to a method and apparatus for re-establishing a ring topology upon power up or reboot following a loss of power.

Background Information

A computer network (sometimes referred to as a data network) is a telecommunications network which allows computing devices to exchange data. The arrangement of the various elements (links, nodes, etc.) of a computer network or data network is referred to as the network topology. Many types of network topologies are known.

One known type of network topology is a ring network. A ring network is a network topology in which each node connects to exactly two other nodes, forming a single continuous pathway for signals through each node. Data travels from node to node, with each node along the way handling every packet. Rings can be unidirectional, with all traffic travelling either clockwise or anticlockwise around the ring, or bidirectional.

It is desirable to maintain ring connectivity in a ring network as long as possible, and interrupt it only if necessary (i.e., there is no power), and then for as short as possible. In other words, it is desirable to be able to re-establish ring connectivity as soon as possible after power becomes available. The reason for this is that without that connectivity, other devices on the ring may become unreachable if some other device on the ring also fails (because redundancy is lost within the ring topology network).

SUMMARY

In one embodiment, a gateway for a computer network is provided. The gateway includes a programmable integrated circuit device, a first port coupled to the programmable integrated circuit device, and a second port coupled to the programmable integrated circuit device. The programmable integrated circuit device is structured and configured to: (i) responsive to a restoration of power to the gateway following a loss of power at the gateway, read configuration information stored by the gateway, the configuration information indicating whether the programmable integrated circuit device is to implement a ring topology through the first port and the second port, and (ii) responsive to determining that the configuration information indicates that the programmable integrated circuit device is to implement a ring topology through the first port and the second port, forward first data traffic from the first port to the second port and forward second data traffic from second port to first port until the programmable integrated circuit device is configured to do otherwise.

In another embodiment, a method of operating a computer network is provided, wherein the computer network has a gateway having a first port and a second port. The method includes storing configuration information in the gateway, the configuration information indicating whether gateway is to implement a ring topology through the first port and the second port, responsive to a restoration of power to the gateway following a loss of power at the gateway, reading the configuration information in the gateway, and responsive to determining that the configuration information indicates that the gateway is to implement a ring topology through the first port and the second port, forwarding first data traffic from the first port to the second port and forward second data traffic from second port to first port until the gateway determines otherwise.

In still another embodiment, gateway for a computer network is provided that includes a programmable integrated circuit device, a first port coupled to the programmable integrated circuit device, and a second port coupled to the programmable integrated circuit device. The programmable integrated circuit device is structured and configured to: (i) responsive to a restoration of power to the gateway following a loss of power at the gateway, read configuration information stored by the gateway, the configuration information indicating whether the programmable integrated circuit device is to detect a ring topology through the first port and the second port, and (ii) responsive to determining that the configuration information indicates that the programmable integrated circuit device is to detect a ring topology through the first port and the second port, detect whether such a ring topology is implemented by examining data received on the first and second ports and determining whether the data indicates that a ring topology management protocol is being used, and (iii) responsive to determining that a ring topology is implemented on the first and second ports, forward first data traffic from the first port to the second port and forward second data traffic from second port to first port until the programmable integrated circuit device is configured to do otherwise.

In yet another embodiment, a method of operating a computer network is provided, wherein the computer network has a gateway having a first port and a second port. The method includes storing configuration information in the gateway, the configuration information indicating whether gateway is to detect a ring topology through the first port and the second port, responsive to a restoration of power to the gateway following a loss of power at the gateway, reading the configuration information in the gateway, responsive to determining that the configuration information indicates that the gateway is to detect a ring topology through the first port and the second port, detecting whether such a ring topology is implemented by examining data received on the first and second ports and determining whether the data indicates that a ring topology management protocol is being used, and responsive to determining that a ring topology is implemented on the first and second ports, forwarding first data traffic from the first port to the second port and forward second data traffic from second port to first port until the gateway is configured to do otherwise.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
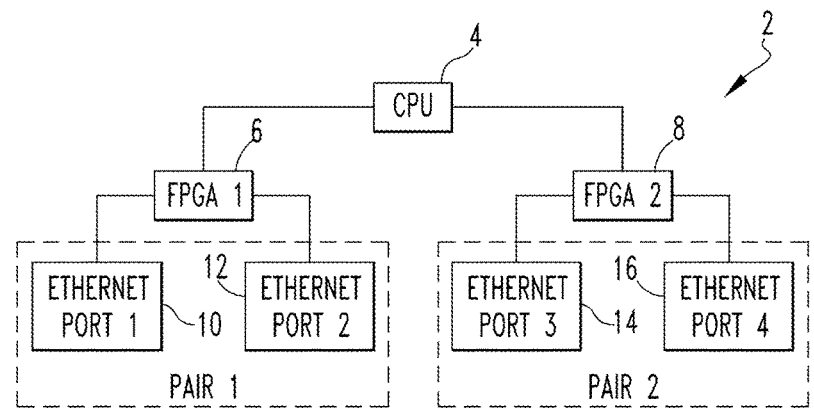
FIG. 1 is a block diagram of a gateway according to one non-limiting, exemplary embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As used herein, the term "number" shall mean one or an integer greater than one (i.e., a plurality).

As used herein, the statement that two or more parts are "coupled" together shall mean that the parts are joined together either directly or joined through one or more intermediate parts.

As used herein, the terms "component" and "system" are intended to refer to a computer related entity, either hardware, firmware, software, or any combination of hardware, firmware and software. For example, a component can be, but is not limited to being, a process running on a processor, a set of processes running in a field-programmable gate array (FPGA), a processor, a an FPGA, an object, an executable, a thread of execution, a program, and/or a computer. One or more components can reside within a process and/or thread of execution, and a component can be localized on one computer and/or distributed between two or more computers.

As used herein, the term "gateway" shall mean a node (i.e., a computer networking device) on a network that serves as an entrance to another network.

FIG. 1 is a block diagram of a gateway 2 according to one non-limiting, exemplary embodiment of the disclosed concept. Gateway 2 may be, for example, and without limitation, a substation gateway that is used in a substation of a power distribution system to perform various operations such as data acquisition and distribution, protocol translation, and remote access to substation intelligent electronic devices. As seen in FIG. 1, gateway 2 includes a central processing unit (CPU) 4. CPU 4 may be, for example, and without limitation, a microprocessor, a microcontroller, or any other suitable processing device. Gateway 2 further includes first and second programmable integrated circuit devices that are coupled to CPU 4. In particular, in the illustrated exemplary embodiment, gateway 2 includes a first field programmable gate array (FPGA) 6 and a second field programmable gate array (FPGA) 8. It will be appreciated, however, that other types of programmable integrated circuit devices may be used in place of FPGAs 6 and 8, such as a complex programmable logic device (CPLD), an application specific integrated circuit (ASIC), a microprocessor, a microcontroller, or some other type of very high-speed integrated circuit (VHSIC).

Gateway 2 further includes first and second pairs of Ethernet ports as seen in FIG. 1. More specifically, gateway 2 includes first Ethernet port 10 and second Ethernet port 12 forming the first pair and third Ethernet port 14 and fourth Ethernet port 16 forming the second pair. Ethernet ports 10 and 12 are connected to first FPGA 6, and third and fourth Ethernet ports 14 and 16 are connected to second FPGA 8.

First FPGA 6 and second FPGA 8 are each provided with firmware that enables first and second FPGAs 6 and 8 to implement standard Ethernet communications. First FPGA 6 and second FPGA 8 are also each provided with firmware that enables first and second FPGAs 6 and 8 to selectively implement the following protocols: (i) the rapid spanning tree protocol (RSTP) (IEEE-802.1w), (ii) the parallel redundancy protocol (PRP) (IEC 62349-3), (iii) the high availability seamless redundancy protocol (HSR) (IEC 62349-3), and (iv) the precision time protocol (PTPv2) (IEEE-1588). In addition, gateway 2 is provided with and stores (either in CPU 4 or in FPGAs 6 and 8, or in a data storage device coupled to FPGAs 6 and 8) configuration information for each FPGA 6, 8 in the form of, for example, and without limitation, a persistent configuration bit for each FPGA 6, 8 that identifies whether or not gateway 2 is, at any particular time, configured in a ring topology via either or both of Ethernet ports 10 and 12 and Ethernet ports 14 and 16. As described herein, that persistent configuration bit in each case is used to rapidly re-establish a ring topology on either or both of Ethernet ports 10 and 12 and Ethernet ports 14 and 16 as applicable in response to a reboot of gateway 2 due to a loss of power (e.g., power down or power failure). More specifically, it will be appreciated that there will be no loss of redundancy (i.e., no loss of the ring connectivity) if gateway 2 reboots for any reason other than a power failure. In such a case, each of FPGA 6 and FPGA 8 will continue to operate as a node in the redundant network until CPU 4 tells it to do otherwise, or may be configured to revert to a mode in which it "emulates a wire" if it is reset but remains powered on. However, there will be a loss of redundancy when gateway 2 is loses power because the ring is disconnected at gateway 2 in this case. Thus, according to an aspect of the disclosed concept, when gateway 2 powers up after a power down or reboots after a power failure, the persistent configuration bit stored for each FPGA 6, 8 tells each FPGA 6, 8 whether it should "emulate a wire", which it will do as soon as it has powered on, loaded its firmware and read the stored configuration bit (which takes about 200 ms after power-up of the board of gateway 2 in the exemplary embodiment). Gateway 2 will then emulate the wire, as appropriate, at Ethernet pair 1 (Ethernet ports 10 and 12) and/or Ethernet pair 2 (Ethernet ports 14 and 16) until CPU 4 is ready and tells it to do otherwise (e.g., until CPU 4 configures gateway 2 for full HSR or RSTP operation). In the exemplary embodiment, both first FPGA 6 and second FPGA 8 are provided with identical firmware that implements the functionality just described.

In another embodiment of the disclosed concept, gateway 2 may include in the configuration stored for FPGA 6, 8, a configuration bit that identifies whether FPGA 6, 8 should attempt to detect whether it participates in a ring topology and should rapidly re-establish that ring topology in response to a reboot of gateway 2 due to a loss of power.

Figure 2:
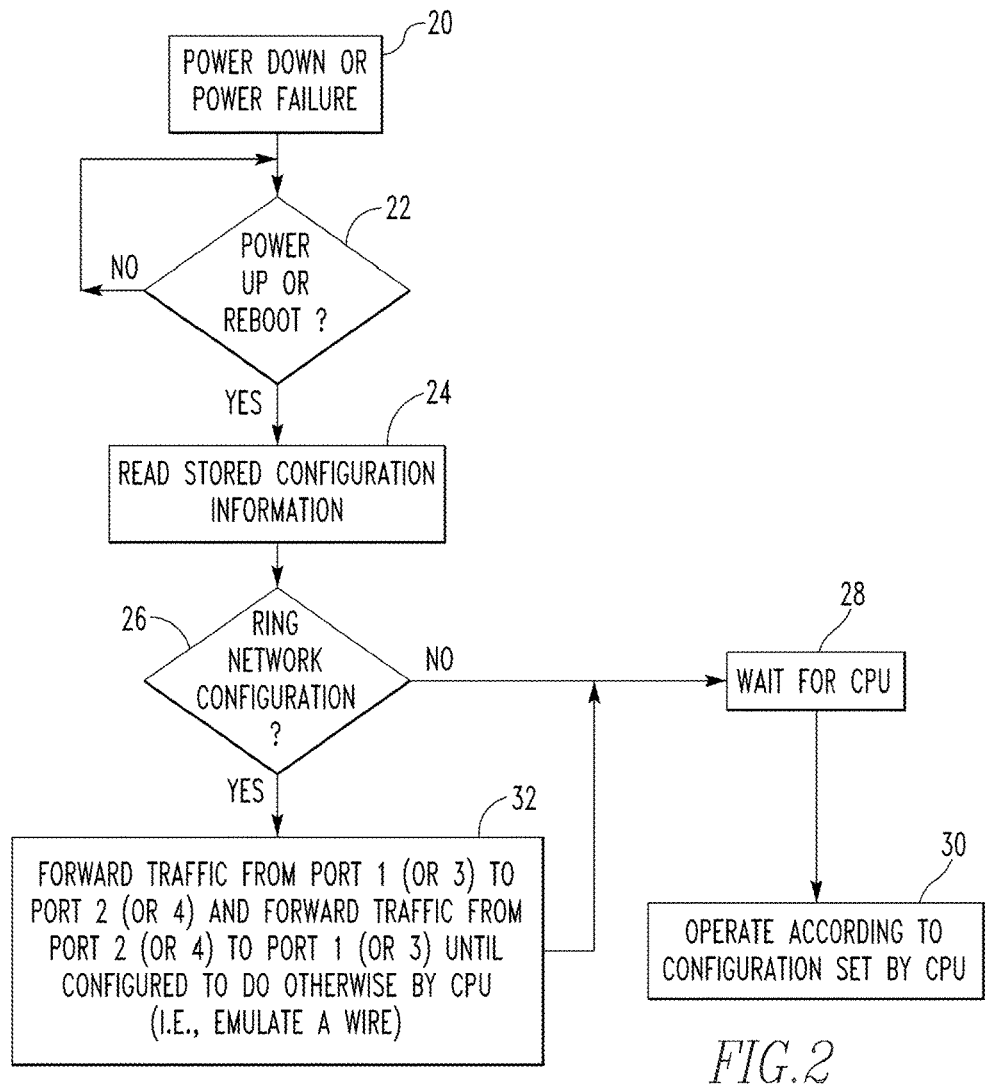
FIG. 2 is a flowchart illustrating a method of rapidly re-establishing a ring topology according to one particular, non-limiting exemplary embodiment of the disclosed concept.

FIG. 2 is a flowchart illustrating a method of rapidly re-establishing a ring topology according to one particular, non-limiting exemplary embodiment of the disclosed concept. In the exemplary embodiment, the method of FIG. 2 is implemented in firmware in first FPGA 6 and second FPGA 8 and is utilized when either is being used to implement a ring topology via the associated pair of Ethernet ports. For illustrative purposes, the method of FIG. 2 will be described in connection with FPGA 6 and the associated Ethernet ports 10 and 12. It will be appreciated, however, that the same operation applies to FPGA 8 and the associated Ethernet ports 14 and 16.

As seen in FIG. 2, the method begins at step 20, wherein there has been a loss of power (a power failure or power down) at gateway 2. Next, at step 22, a determination is made as to whether gateway 2 has been powered up or rebooted in response to the loss of power. If the answer is no, the method continues to monitor whether such a power up or reboot has occurred. If, however, the answer at step 22 is yes, then the method proceeds to step 24. At step 24, FPGA 6 reads the stored configuration bit for FPGA 6. As noted elsewhere herein, the configuration bit may be stored in either CPU 4 or FPGA 6, or in a data storage device coupled to FPGAs 6 and 8. Next, at step 26, a determination is made as to whether the stored configuration bit indicates that FPGA 6 is being used to implement a ring topology. For example, and without limitation, a configuration bit value of 0 may indicate no ring topology and a configuration bit value of 1 may indicate a ring topology. If the answer at step 26 is no, then the method proceeds to step 28 and waits for instructions from CPU 4, at which time it proceeds to step 30 and FPGA 6 operates in accordance with the configuration set by CPU 4. If, however, the answer at step 26 is yes, then the method proceeds to step 32. At step 32, FPGA 6 causes gateway 2 to "emulate a wire" until instructed to do otherwise by CPU 4. In particular, FPGA 6 will "emulate a wire" by forwarding data traffic from Ethernet port 10 to Ethernet port 12 and forwarding data traffic from Ethernet port 12 to Ethernet port 10 until configured to do otherwise by CPU 4, at which time it proceeds to steps 28 and 30 and FPGA 6 operates in accordance with the configuration set by CPU 4. Thus, the operation just described ensures a rapid re-establishment of a ring topology upon a power up or reboot following a power down or power failure. In the exemplary embodiment, the ring topology will be established in a time period of around 100 to 200 ms, as opposed to a period of 1 to 2 seconds that is common in the prior art.

Figure 3:
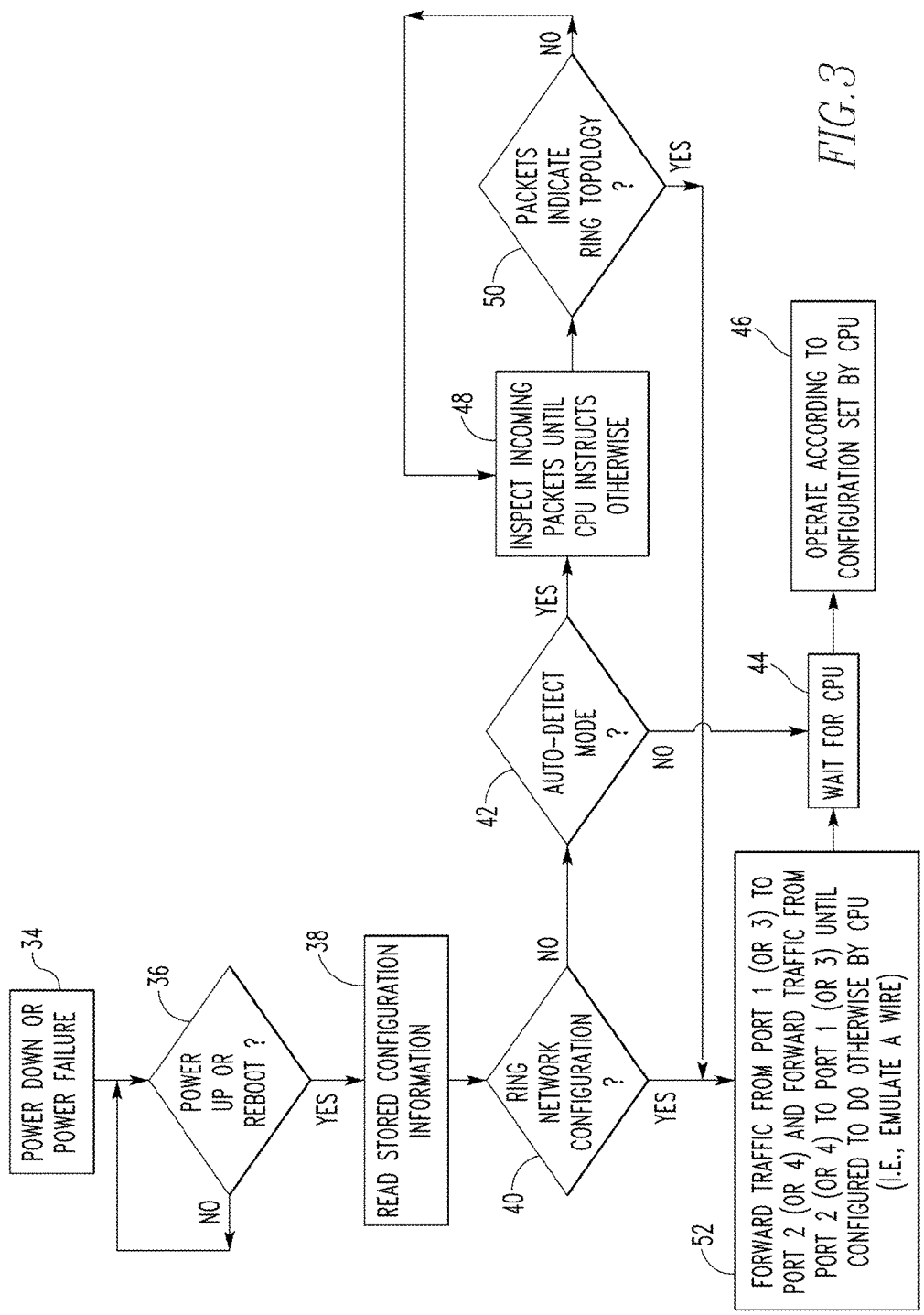
FIG. 3 is a flowchart illustrating a method of rapidly re-establishing a ring topology according to another particular, non-limiting exemplary embodiment of the disclosed concept.

FIG. 3 is a flowchart illustrating a method of rapidly re-establishing a ring topology according to another particular, non-limiting exemplary embodiment of the disclosed concept. For illustrative purposes, the method of FIG. 3 will be described in connection with FPGA 6 and the associated Ethernet ports 10 and 12. It will be appreciated, however, that the same operation applies for FPGA 8 and the associated Ethernet ports 14 and 16.

As seen in FIG. 3, the method begins at step 34, wherein there has been a loss of power (a power failure or power down) at gateway 2. Next, at step 36, a determination is made as to whether gateway 2 has been powered up or rebooted in response to the loss of power. If the answer is no, the method continues to monitor whether such a power up or reboot has occurred. If, however, the answer at step 36 is yes, then the method proceeds to step 38. At step 38, FPGA 6 reads the stored configuration bits for FPGA 6. As noted elsewhere herein, the configurations bit may be stored in either CPU 4 or FPGA 6, or in a data storage device coupled to FPGA 6. Next, at step 40, a determination is made as to whether the stored configuration bits indicate that FPGA 6 is being used to implement a ring topology. If the answer at step 40 is no, then the method proceeds to step 42. At step 42, a determination is made as to whether the stored configuration bits indicate that FPGA 6 should attempt to automatically detect the presence of a ring topology. For example, and without limitation, a configuration bit value of 0 may indicate that it should attempt to automatically detect the presence of a ring topology and a configuration bit value of 1 may indicate it should not. If the answer at step 42 is no, the method proceeds to step 44 and waits for instructions from CPU 4 at which time it proceeds to step 46 wherein it operates in accordance with the configuration set by CPU 4. If, however, the answer at step 42 is yes, the method proceeds to step 48 and will inspect any Ethernet frames it receives on either Ethernet port 10 or 12 to determine whether these Ethernet frames indicate the presence of a ring topology. This determination may be made, for example and without limitation, by the presence of Ethernet frames with the HSR Ethertype (as described in IEC 62439-3 section 5.7) being received on both Ethernet ports. As the determination is made, the method proceeds to step 50 where it decides whether it should conclude that it is, indeed, in a ring topology. This would be the case, for example and without limitation, if HSR packets are repeatedly received on both ports. If the answer at step 50 is no, the method proceeds back to step 48 and will continue to determine whether it is part of a ring topology. If the answer at step 50 is yes, it will proceed to step 52, described below. While not shown in FIG. 3, it will be understood that the method may proceed to step 46 at any time if CPU 4 becomes available and instructs the FPGA 6 to do so. At step 52, FPGA 6 causes gateway 2 to "emulate a wire" until instructed to do otherwise by CPU 4. In particular, FPGA 6 will "emulate a wire" by forwarding data traffic from Ethernet port 10 to Ethernet port 12 and forwarding data traffic from Ethernet port 12 to Ethernet port 10 until configured to do otherwise by CPU 4, at which time it proceeds to steps 44 and 46 and FPGA 6 operates in accordance with the configuration set by CPU 4. Thus, the operation just described ensures a rapid re-establishment of a ring topology upon a power up or reboot following a power down or power failure.

Figure 4:
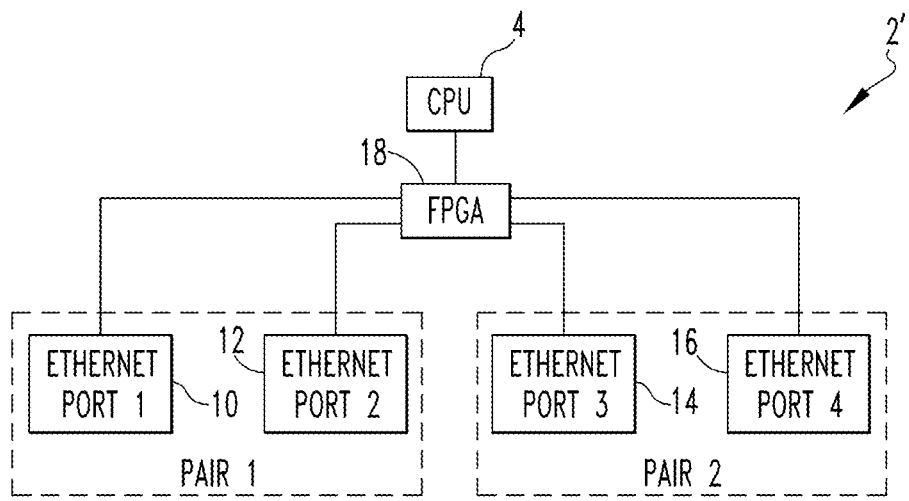
FIG. 4 is a block diagram of a gateway according to an alternative non-limiting, exemplary embodiment of the disclosed concept.

FIG. 4 is a block diagram of a gateway 2' according to an alternative non-limiting, exemplary embodiment of the disclosed concept. Gateway 2' is similar to gateway 2, and like parts are labelled with like reference numerals. Gateway 2' differs from gateway 2, however, in that gateway 2' includes a single FPGA 18 (or similar devices as described herein) that is coupled to both of the pairs of Ethernet ports. FPGA 18 is provided with firmware as described herein and is structured and configured to implement the method of FIG. 2 or the method of FIG. 3 with respect to Ethernet ports 10 and 12 or Ethernet ports 14 and 16, as needed.

Figure 5:
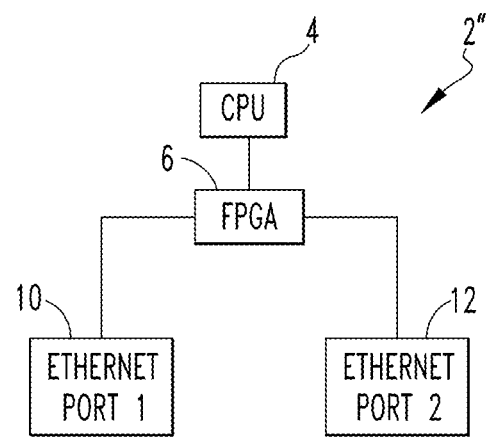
FIG. 5 is a block diagram of a gateway according to another alternative non-limiting, exemplary embodiment of the disclosed concept.

FIG. 5 is a block diagram of a gateway 2" according to another alternative non-limiting, exemplary embodiment of the disclosed concept. Gateway 2" is similar to gateway 2, and like parts are labelled with like reference numerals. Gateway 2" differs from gateway 2, however, in that gateway 2" includes a single FPGA 6 (or similar devices as described herein) that is coupled to a single pairs of Ethernet ports 10 and 12. As described elsewhere herein, FPGA 6 is provided with firmware configured to implement the method of FIG. 2 or the method of FIG. 3 with respect to Ethernet ports 10 and 12.

Figure 6:
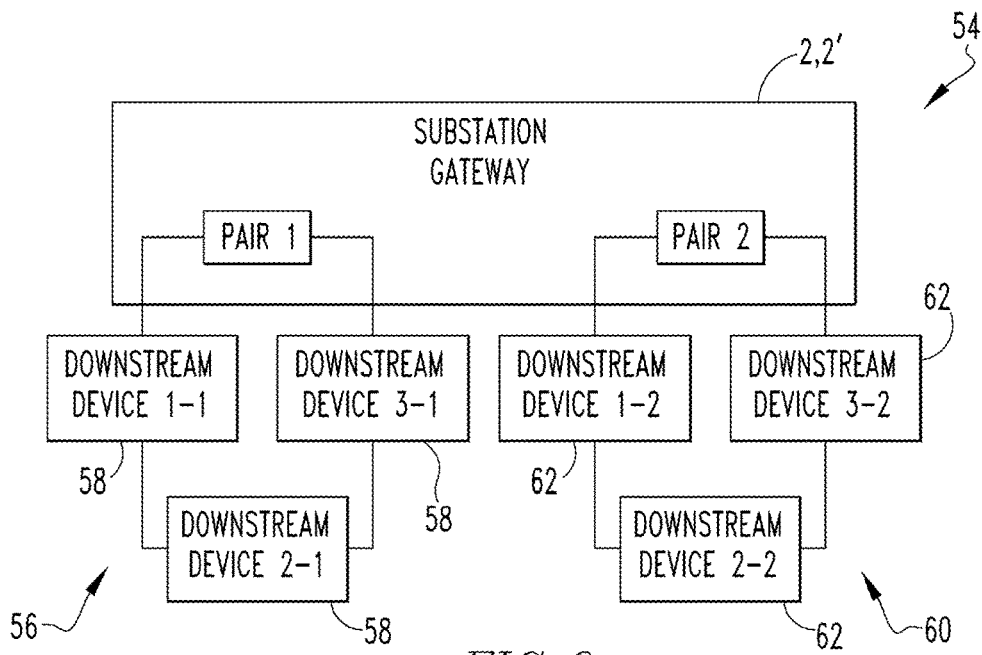
FIG. 6 is a block diagram of a computer network according to one exemplary embodiment of the disclosed concept.

FIG. 6 is a block diagram of a computer network 54 according to one exemplary embodiment of the disclosed concept. As seen in FIG. 6, in computer network 54, gateway 2 or 2' is used to establish a first ring topology 56 including downstream devices 58 (which may be, for example, and without limitation, intelligent electronic devices (IEDs) as commonly found in power systems substations) via the first pair of Ethernet ports (10 and 12), and is used to establish a second ring topology 60 including downstream devices 62 (which may be, for example, and without limitation, a mix of IEDs and RedBox devices, permitting access to devices with no HSR capabilities) via the second pair of Ethernet ports (14 and 16). In computer network 62, the method of FIG. 2 or the method of FIG. 3 is used to re-establish the ring connection in either first ring topology 56 or second ring topology 60, as needed, following a loss of power at gateway 2 or 2'. It will be appreciated that gateway 2 or 2' may also be used to establish a non-ring topology (e.g., a daisy chain topology) via the first pair of Ethernet ports (using downstream devices 58) and/or the second pair of Ethernet ports (using downstream devices 60).

Figure 7:
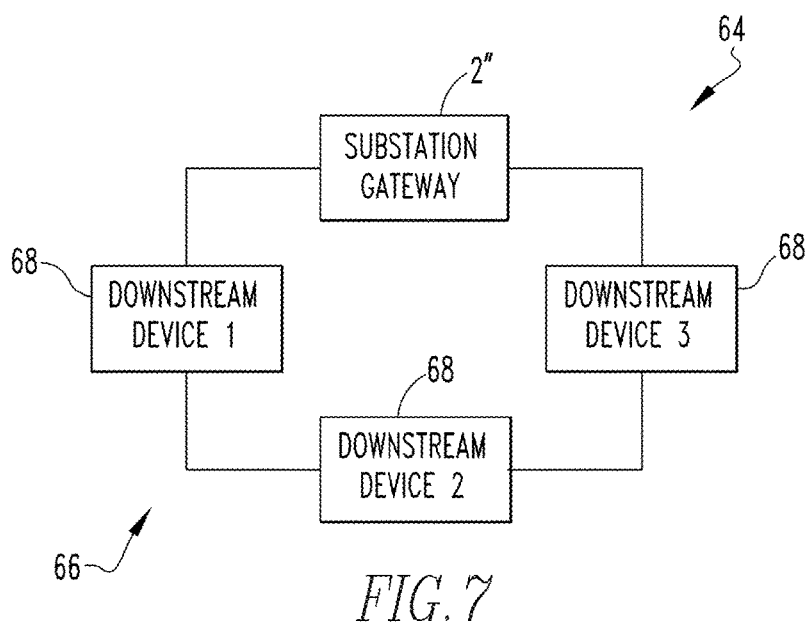
FIG. 7 is a block diagram of a computer network according to another exemplary embodiment of the disclosed concept.

FIG. 7 is a block diagram of a computer network 64 according to another exemplary embodiment of the disclosed concept. As seen in FIG. 7, in computer network 64, gateway 2'' is used to establish a ring topology 66 including downstream devices 68 (which may be, for example, and without limitation, intelligent electronic devices (IEDs) as commonly found in power systems substations) via Ethernet ports 10 and 12. In computer network 64, the method of FIG. 2 or the method of FIG. 3 is used to re-establish the ring connection in ring topology 66 following a loss of power at gateway 2''. It will be appreciated that gateway 2'' may also be used to establish a non-ring topology (e.g., a daisy chain topology) via Ethernet ports 10 and 12.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A gateway for a computer network, comprising:
    a programmable integrated circuit device;
    a first port coupled to the programmable integrated circuit device; and
    a second port coupled to the programmable integrated circuit device;
    wherein the programmable integrated circuit device is structured and configured to: responsive to a restoration of power to the gateway following a loss of power at the gateway, read configuration information stored by the gateway, the configuration information having two possible states, wherein a first one of the two possible states indicates that the programmable integrated circuit device is to implement a ring topology through the first port and the second port and wherein a second one of the two possible states indicates that the programmable integrated circuit device is not to implement a ring topology through the first port and the second port, and responsive to determining that the configuration information has the first state, forward first data traffic from the first port to the second port and forward second data traffic from second port to first port until the programmable integrated circuit device is configured to do otherwise.

2. The gateway according to claim 1, wherein the programmable integrated circuit device is a field programmable gate array, a complex programmable logic device, an application specific integrated circuit, a microprocessor, a microcontroller, or very high-speed integrated circuit.

3. The gateway according to claim 2, wherein the programmable integrated circuit device is a field programmable gate array.

4. The gateway according to claim 1, further comprising a central processing unit coupled to the programmable integrated circuit device.

5. The gateway according to claim 4, wherein the central processing unit stores the configuration information.

6. The gateway according to claim 1, wherein a data storage device coupled to the programmable integrated circuit device stores the configuration information.

7. The gateway according to claim 1, wherein the first port is a first Ethernet port and the second port is a second Ethernet port.

8. The gateway according to claim 1, wherein the programmable integrated circuit device includes firmware configured for implementing one or more of standard Ethernet communications, the rapid spanning tree protocol (RSTP) (IEEE-802.1w), the parallel redundancy protocol (PRP) (IEC 62349-3), the high availability seamless redundancy protocol (HSR) (IEC 62349-3), and the precision time protocol (PTPv2) (IEEE-1588).

9. The gateway according to claim 1, further comprising:
    a second programmable integrated circuit device;
    a third port coupled to the second programmable integrated circuit device; and
    a fourth port coupled to the second programmable integrated circuit device;
    wherein the second programmable integrated circuit device is structured and configured to: (i) responsive to a restoration of power to the gateway following a loss of power at the gateway, read second configuration information stored by the gateway, the second configuration information indicating whether the second programmable integrated circuit device is to implement a ring topology through the third port and the fourth port, and (ii) responsive to determining that the second configuration information indicates that the second programmable integrated circuit device is to implement a ring topology through the third port and the fourth port, forward third data traffic from the third port to the fourth port and forward fourth data traffic from fourth port to third port until the second programmable integrated circuit device is configured to do otherwise.

10. The gateway according to claim 9, wherein the first, second, third and fourth ports and the first and second programmable integrated circuit devices are situated on a removable extension board.

11. The gateway according to claim 10, wherein the gateway said removable extension board and a number of additional removable extension boards.

12. A method of operating a computer network, the computer network having a gateway having a first port and a second port, the method comprising:
    storing configuration information in the gateway, the configuration information having two possible states, wherein a first one of the two possible states indicates that the gateway is to implement a ring topology through the first port and the second port and wherein a second one of the two possible states indicates that the gateway is not to implement a ring topology through the first port and the second port;
    responsive to a restoration of power to the gateway following a loss of power at the gateway, reading the configuration information in the gateway; and
    responsive to determining that the configuration information has the first state, forwarding first data traffic from the first port to the second port and forward second data traffic from second port to first port until the gateway determines otherwise.

13. The method according to claim 12, wherein the first port is a first Ethernet port and the second port is a second Ethernet port.

14. The method according to claim 13, wherein the gateway includes firmware configured for implementing one or more of standard Ethernet communications, the rapid spanning tree protocol (RSTP) (IEEE-802.1w), the parallel redundancy protocol (PRP) (IEC 62349-3), the high availability seamless redundancy protocol (HSR) (IEC 62349-3), and the precision time protocol (PTPv2) (IEEE-1588).

15. An apparatus having a non-transitory storage medium storing firmware for implementing the method of claim 12.

16. A gateway for a computer network, comprising:
a programmable integrated circuit device;
a first port coupled to the programmable integrated circuit device; and
a second port coupled to the programmable integrated circuit device;
wherein the programmable integrated circuit device is structured and configured to: (i) responsive to a restoration of power to the gateway following a loss of power at the gateway, read configuration information stored by the gateway, the configuration information indicating whether the programmable integrated circuit device is to detect a ring topology through the first port and the second port, and (ii) responsive to determining that the configuration information indicates that the programmable integrated circuit device is to detect a ring topology through the first port and the second port, detect whether such a ring topology is implemented by examining data received on the first and second ports and determining whether the data indicates that a ring topology management protocol is being used, and (iii) responsive to determining that a ring topology is implemented on the first and second ports, forward first data traffic from the first port to the second port and forward second data traffic from second port to first port until the programmable integrated circuit device is configured to do otherwise.

17. The gateway according to claim 16, wherein the programmable integrated circuit device is a field programmable gate array, a complex programmable logic device, an application specific integrated circuit, a microprocessor, a microcontroller, or very high-speed integrated circuit.

18. The gateway according to claim 17, wherein the programmable integrated circuit device is a field programmable gate array.

19. The gateway according to claim 16, further comprising a central processing unit coupled to the programmable integrated circuit device.

20. The gateway according to claim 19, wherein the central processing unit stores the configuration information.

21. The gateway according to claim 16, wherein a data storage device coupled to the programmable integrated circuit device stores the configuration information.

22. The gateway according to claim 16, wherein the first port is a first Ethernet port and the second port is a second Ethernet port.

23. The gateway according to claim 16, wherein the programmable integrated circuit device includes firmware configured for implementing one or more of standard Ethernet communications, the rapid spanning tree protocol (RSTP) (IEEE-802.1w), the parallel redundancy protocol (PRP) (IEC 62349-3), the high availability seamless redundancy protocol (HSR) (IEC 62349-3), and the precision time protocol (PTPv2) (IEEE-1588).

24. The gateway according to claim 16, further comprising:
a second programmable integrated circuit device;
a third port coupled to the second programmable integrated circuit device; and
a fourth port coupled to the second programmable integrated circuit device;
wherein the second programmable integrated circuit device is structured and configured to: (i) responsive to a restoration of power to the gateway following a loss of power at the gateway, read second configuration information stored by the gateway, the second configuration information indicating whether the second programmable integrated circuit device is to implement a ring topology through the third port and the fourth port, and (ii) responsive to determining that the second configuration information indicates that the second programmable integrated circuit device is to implement a ring topology through the third port and the fourth port, forward third data traffic from the third port to the fourth port and forward fourth data traffic from fourth port to third port until the second programmable integrated circuit device is configured to do otherwise.

25. The gateway according to claim 24, wherein the first, second, third and fourth ports and the first and second programmable integrated circuit devices are situated on a removable extension board.

26. The gateway according to claim 25, wherein the gateway said removable extension board and a number of additional removable extension boards.

27. A method of operating a computer network, the computer network having a gateway having a first port and a second port, the method comprising:
storing configuration information in the gateway, the configuration information indicating whether gateway is to detect a ring topology through the first port and the second port;
responsive to a restoration of power to the gateway following a loss of power at the gateway, reading the configuration information in the gateway;
responsive to determining that the configuration information indicates that the gateway is to detect a ring topology through the first port and the second port, detecting whether such a ring topology is implemented by examining data received on the first and second ports and determining whether the data indicates that a ring topology management protocol is being used; and
responsive to determining that a ring topology is implemented on the first and second ports, forwarding first data traffic from the first port to the second port and forward second data traffic from second port to first port until the gateway is configured to do otherwise.

28. The method according to claim 27, wherein the first port is a first Ethernet port and the second port is a second Ethernet port.

29. The method according to claim 28, wherein the gateway includes firmware configured for implementing one or more of standard Ethernet communications, the rapid spanning tree protocol (RSTP) (IEEE-802.1w), the parallel redundancy protocol (PRP) (IEC 62349-3), the high availability seamless redundancy protocol (HSR) (IEC 62349-3), and the precision time protocol (PTPv2) (IEEE-1588).

30. An apparatus having a non-transitory storage medium storing firmware for implementing the method of claim 27.

* * * * *